Patented Oct. 28, 1952

2,615,896

UNITED STATES PATENT OFFICE 2,615,896

PREPARATION OF 3-PYRIDYL-CARBINOL

George Oswald Chase, Hawthorne, N. J., assignor to Hoffmann-La Roche Inc., Nutley, N. J., a corporation of New Jersey No Drawing. Application January 20, 1950, Serial No. 139,780

5 Claims. (Cl. 260—297.5)

This invention relates to a process for making 3-pyridyl-carbinol (β-hydroxymethyl-pyridine), a compound which is useful in preparing medicinal agents, e. g. vasodilators.

Briefly, the process comprises catalytically hydrogenating 3-cyano-pyridine in relatively highly acid aqueous solution, preferably below pH 2, and reacting the resulting aqueous acid solution with methyl nitrite or ethyl nitrite to produce 3-pyridyl-carbinol.

A preferred procedure comprises hydrogenating 3-cyano-pyridine in aqueous acid solution containing hydrochloric acid in the ratio of about 1.75 mols of HCl for each mol of 3-cyano-pyridine and in the presence of a palladium charcoal catalyst, filtering off the catalyst, warming the resulting aqueous hydrochloric acid solution, passing ethyl nitrite into the warm acid solution, and refluxing to produce the desired 3-pyridyl-carbinol. Methyl nitrite may be used instead of ethyl nitrite, if desired.

The following example is illustrative of the invention, but should not be deemed to limit the invention, since equivalents within the scope of the claims will be obvious to those skilled in the art.

Example

The catalyst is prepared by suspending 5 kg. of catalyst grade charcoal in 200 l. of water, in a pressure vessel, and adding thereto 25 l. of 4 per cent (as Pd metal) aqueous palladous chloride. Air is displaced from the vessel and then hydrogen is passed into the aqueous mixture at a pressure of 3-5 p. s. i., while stirring, until no further absorption is noted and the chloride is completely reduced to metal.

To the aqueous suspension of the palladized charcoal catalyst thus obtained are added 20.8 kg. of 3-cyano-pyridine (96 per cent purity); and then are added 70 l. of a hydrochloric acid solution prepared by diluting 30 l. of 36 per cent HCl with 40 l. of water. This represents approximately 1.75 mols of HCl for each mol of 3-cyano-pyridine. The suspension is maintained at 10°–15° C. and stirred continuously while introducing a current of hydrogen at a pressure of 3-5 p. s. i. When absorption of hydrogen ceases and the 3-cyano-pyridine is completely reduced, the reaction mixture is filtered to remove the catalyst. The filter cake is washed with 40 l. of water in two equal portions, and the wash water is added to the filtrate.

The combined liquors, which comprise an aqueous hydrochloric acid solution of 3-aminomethyl-pyridine hydrochloride, are then heated to a temperature of 60°–65° C., and ethyl nitrite gas is passed into the heated solution. The ethyl nitrite is generated by placing 20 l. of 90 per cent ethyl alcohol in a suitable vessel, diluting with 200 l. of water, and, while stirring, adding to the dilute alcohol 18.3 kg. of nitrosyl chloride at the rate of 2.25 kg. per hour. (The process using methyl nitrite is carried out by substituting a stoichiometrically equivalent quantity of methyl alcohol for the ethyl alcohol).

When all the ethyl nitrite has been added, the reaction mixture is refluxed for approximately one hour, then concentrated to dryness under reduced pressure (25 to 30 mm. Hg) and at a maximum temperature of 70° C. The crystalline residue is dissolved in 35 l. of water and adjusted to a pH of 8-9 by addition (with cooling and stirring) of 11-12 kg. of caustic soda. The sodium chloride formed is filtered off, and the filter cake is washed with 20 l. of normal butyl alcohol. This wash liquid is used for the first extraction of the product from the aqueous filtrate. The filtrate is then further extracted with four successive 20-liter portions of n-butyl alcohol. All the extracts are combined and concentrated in vacuo (100° C./20 mm.) to remove the n-butyl alcohol. The residue is submitted to fractionation under reduced pressure. The forerun (up to 112° C./2-3 mm.) consists of a small amount of n-butyl alcohol and some 3-pyridyl-carbinol. The main fraction, boiling at 112–114° C./2-3 mm., consists of 3-pyridyl-carbinol.

I claim:

1. A process which comprises subjecting 3-cyano-pyridine in acidic aqueous solution and in the presence of a hydrogenation catalyst to the action of hydrogen.

2. A process according to claim 1 in which the hydrogenation catalyst is a palladium catalyst.

3. A process according to claim 2 in which the acidic aqueous solution is a highly acidic hydrochloric acid solution.

4. A process according to claim 2 in which the solution has a pH below about pH 2.

5. A process which comprises subjecting 3-cyano-pyridine in a solution containing water and hydrochloric acid in the molar ratio 1:1.75 3-cyano-pyridine:HCl, and in the presence of a palladium hydrogenation catalyst, to the action of hydrogen.

GEORGE OSWALD CHASE.

REFERENCES CITED

The following references are of record in the file of this patent:

UNITED STATES PATENTS

| Number | Name | Date |
|---|---|---|
| 2,310,167 | Carlson | Feb. 2, 1943 |
| 2,483,137 | Harris | Sept. 27, 1949 |

OTHER REFERENCES

Ser. No. 346,569, Zima (A. P. C.), published Apr. 20, 1943.